G. L. INGRAM.
Paper-Scoring and Cutting-Machine.
No. 212,314. Patented Feb. 18, 1879.
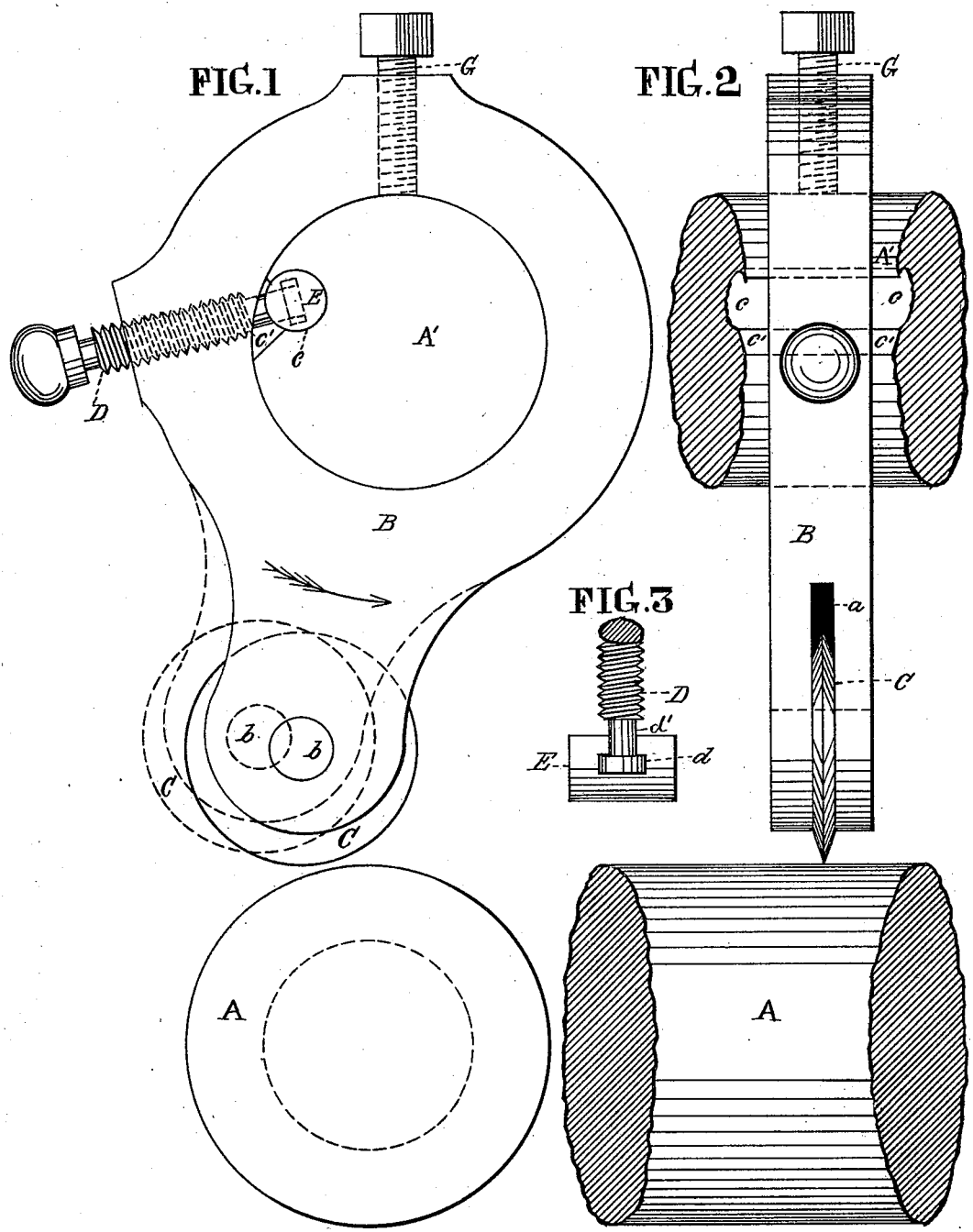

UNITED STATES PATENT OFFICE.

GEORGE L. INGRAM, OF PHILADELPHIA, PENNSYLVANIA, ASSIGNOR TO JACOB LODGE & SON, OF SAME PLACE.

IMPROVEMENT IN PAPER SCORING AND CUTTING MACHINES.

Specification forming part of Letters Patent No. 212,314, dated February 18, 1879; application filed November 14, 1878.

*To all whom it may concern:*

Be it known that I, GEORGE L. INGRAM, of the city and county of Philadelphia, in the State of Pennsylvania, have invented a new and useful Improvement in Paper Scoring and Cutting Machines, of which the following is a specification:

My invention consists in the combination of a cutter-holder with a stationary shaft and the paper-carrying roller by the following means: The shaft has a longitudinal groove throughout its whole length, of a concentric form at its bottom, and with an oblique opening at the periphery of the shaft. A cylindrical slide is fitted to said groove, which is of uniform size from end to end, to admit of the connection of the slides of any desirable number of cutter-holders. The slide is adapted to be moved circumferentially as well as longitudinally in relation to the shaft, by means of an adjusting-screw arranged in an oblique position from the center of the shaft, as described hereinafter, so as to adjust the cutter into the proper position for cutting or scoring, and by a reverse action of the screw the cutter is removed from its work, or any desirable distance from the paper-carrying roller. The holder is held in the adjusted positions by means of a set-screw, as hereinafter described.

In the accompanying drawings, Figure 1 is an end elevation of the scoring and cutting apparatus without the stationary frame. Fig. 2 is a front elevation of the same. Fig. 3 is a side view of the slide E, in connection with the adjusting-screw D.

Like letters of reference in all the figures indicate the same parts.

A is the paper-carrier roller, and A' a stationary shaft for holding any desirable number of cutter-holders B, situated upon it, as shown in Fig. 1.

In the lower end of the holder B there is a slot, *a*, in which is placed the circular cutter C on the pin *b*.

The holder is provided with an adjusting-screw, D, which is obliquely arranged in relation to the center of the shaft A', as seen in Fig. 1.

The shaft is provided with a longitudinal groove, *c*, throughout its whole length, circular at the bottom, but having an oblique opening, *c'*, at the periphery of the shaft, as shown in Fig. 1, in the direction of the adjusting-screw D.

The end of the screw is provided with an annular or disk-like head and neck, *d'*, as shown in Fig. 3, by which it is connected with the cylindrical slide E, which has a corresponding cross-groove, *d*, of T form, to receive the head and neck of the screw, as shown in said Fig. 3.

The slide is of cylindrical form, as represented, whereby it may be moved circumferentially in either direction in the groove, as the lateral movement is given to the cutter-holder B, which is effected by the action of the screw D.

The cutter-holder is turned in the direction of the arrow, to bring the cutter C into its arrangement with the carrying-roller A, ready for work, by forcing the adjusting-screw so as to press the cylindrical slide E against the side of the groove *c* opposite the screw. By a reverse movement of the screw, whereby the slide is pressed against the other side of the groove, the holder is turned in the opposite direction, to bring the cutter into the position shown by dotted lines, when the cutter is required to be removed from its work.

The holder is held in either position by means of the set-screw G.

I claim as my invention—

1. The stationary shaft A', having a longitudinal groove, *c*, with an oblique side opening, *c'*, for holding the slide E, of cylindrical form, the lower part of the groove being of circular form in its cross-section, substantially in the manner and for the purpose set forth.

2. The cutter-holder B, having an obliquely-arranged adjusting-screw, D, in combination with the slide E and stationary shaft A', having a longitudinal groove, *c* and *c'*, substantially as and for the purpose set forth.

3. The combination of the set-screw G with the cutter-holder B, having an oblique adjusting-screw, D, and the shaft A', having a longitudinal groove, *c*, substantially as and for the purpose set forth.

GEORGE L. INGRAM.

Witnesses:
 STEPHEN USTICK,
 WM. LARZELERE.